(12) United States Patent
Singh et al.

(10) Patent No.: US 8,611,846 B2
(45) Date of Patent: Dec. 17, 2013

(54) ONE-WAY BUFFERED COMMUNICATOR

(75) Inventors: Amandeep Singh, Scarborough (CA); Frank Mandarino, Georgetown (CA)

(73) Assignee: Endrelia Technologies Inc., Toronto (CA)

( * ) Notice: Subject to any disclaimer, the term of this patent is extended or adjusted under 35 U.S.C. 154(b) by 1266 days.

(21) Appl. No.: 11/962,327

(22) Filed: Dec. 21, 2007

(65) Prior Publication Data
US 2009/0161787 A1     Jun. 25, 2009

(51) Int. Cl.
*H04L 27/00*     (2006.01)
(52) U.S. Cl.
USPC ........................................ 455/404.1; 375/295
(58) Field of Classification Search
USPC .............. 455/403–404.2, 66.1; 340/287–309; 379/37–51; 375/295
See application file for complete search history.

(56) References Cited

U.S. PATENT DOCUMENTS

| | | |
|---|---|---|
| 2003/0103144 A1 | 6/2003 | Sesek et al. |
| 2003/0231115 A1 | 12/2003 | Stanners et al. |
| 2004/0075547 A1 | 4/2004 | Vojtech et al. |
| 2005/0111660 A1 | 5/2005 | Hosoda |
| 2005/0287980 A1 | 12/2005 | Wood |
| 2006/0203971 A1* | 9/2006 | Anderson ........................ 379/45 |
| 2007/0072581 A1 | 3/2007 | Aerrabotu |
| 2007/0189711 A1* | 8/2007 | Ash et al. ........................ 386/83 |
| 2009/0109008 A1* | 4/2009 | Kuo et al. ................. 340/426.18 |
| 2009/0318110 A1* | 12/2009 | Zarefoss .................... 455/404.2 |
| 2010/0085216 A1* | 4/2010 | Ms .................................. 341/20 |

FOREIGN PATENT DOCUMENTS

WO     2004104962     12/2004

OTHER PUBLICATIONS

PCT International Searching Authority (CA), Written Opinion of the International Searching Authority for International Application No. PCT/CA2008-002247, Apr. 8, 2009.
European Patent Office, Extended Search Report for EP Patent App. No. 08863524.8, Dec. 18, 2012.
European Patent Office, Supplementary European Search Report for EP Patent Appln No. 08863524-8, Jan. 7, 2013.

* cited by examiner

*Primary Examiner* — Kashif Siddiqui
(74) *Attorney, Agent, or Firm* — Borden Ladner Gervais LLP; Jeffrey W. Wong

(57) ABSTRACT

A system and method of one-way buffered communication for reporting emergency or alarm situation where there is little or no time to wait for a telephone connection to be established. The buffered communication apparatus including apparatus for storing sound input and apparatus for establishing a connection between the communication apparatus and a predetermined party. Once the communication apparatus is activated, both sound storage and call establishment is started and the stored data is transmitted once the connection is established.

21 Claims, 7 Drawing Sheets

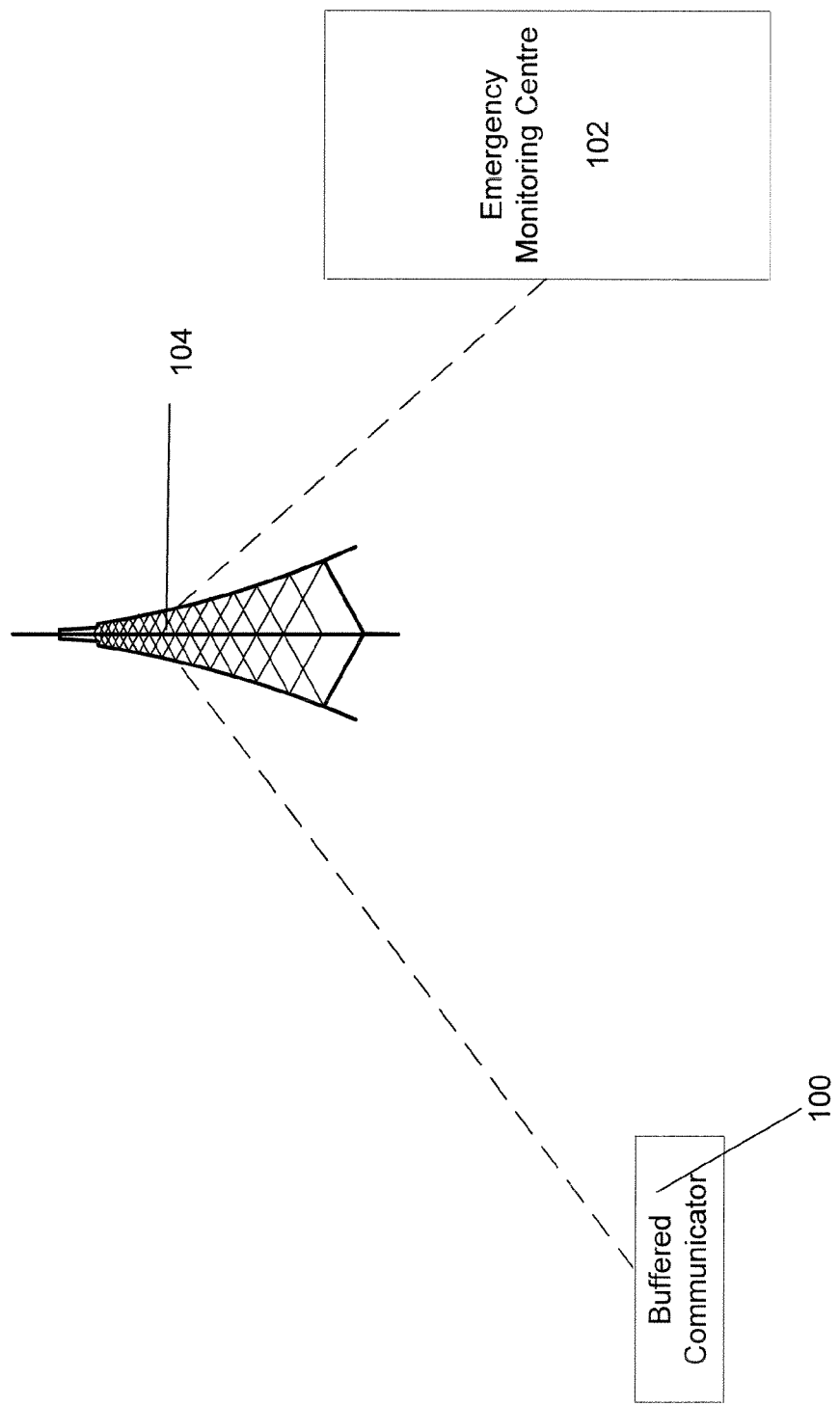

ONE-WAY BUFFERED COMMUNICATOR

FIELD OF THE INVENTION

The present invention relates generally to a communication apparatus. More particularly, the present invention relates to a one-way buffered communication apparatus.

BACKGROUND OF THE INVENTION

Traditionally, communication devices are used for two-way communication between parties which allow for real-time conversations to occur. Examples of two-way communication devices include walkie-talkie radios, telephones, cellular phones, home alarm systems and dedicated emergency handling panic button devices such as those offered by ADT, etc.

These communication devices are also very helpful in allowing a user to report an emergency or alarm situation to emergency personnel or call operators and are well suited when the user who is calling is not under immediate threat and where the nature of the emergency needs to be discussed and/or communicated, for example, if the user is a neighbor who can see a fire burning, an assault occurring or an individual collapsing on the sidewalk or if the user has time to report the emergency in which they are involved. However, situations arise when the user finds himself or herself in a situation where two-way communication devices are unusable because there is not enough time for the user to wait for a connection to be established before speaking. Moreover, even if a connection is established, depending on the type of emergency, the user may not be in a position to carry out a conversation.

Also, some emergencies occur in remote areas where there is intermittent or no wireless coverage. In this case, even if the person has a cell phone or some emergency communication device, a telephone call can not be reliably established.

It is, therefore, desirable to provide a novel method and apparatus for one-way buffered communication.

SUMMARY OF THE INVENTION

It is an object of the present invention to obviate or mitigate at least one disadvantage of previous communication apparatuses.

The invention, which is a one-way buffered communicator, allows a user to immediately start communicating with another party before a call connection is established between the user and the other party. This is especially helpful when the user is experiencing an emergency or alarm situation where two-way communication is not preferred or possible. The device has a buffer, or memory, which stores recorded sounds received by a microphone. The recording starts immediately when the device is activated. Simultaneously, the device starts to establish a connection with a receiving station or monitoring centre. When a connection is established, the device relays the recorded sound to the other party. If the connection to the monitoring centre is lost, the device continues to record the incoming sound data and simultaneously attempts to re-establish the connection. Once re-connected, the device preferably starts transmitting sound from the point the connection was dropped.

In a first aspect, the present invention provides a one-way buffered communication apparatus comprising a data recording system for storing data from an external source; and a system for establishing a communication link; wherein after the communication apparatus is activated, the data recording system stores the data and the system for establishing the communication link attempts to establish a connection with a predetermined party, and wherein the stored data is transmitted to the predetermined party once the connection is established.

In a further embodiment, there is provided a method of providing one-way buffered communication comprising sensing a request for one-way buffered communication; storing input from an external source; establishing a communication link with a predetermined party; and transmitting the stored input to the predetermined party once the connection is established.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1a is a schematic view of a one way buffered communication apparatus in a communication environment;

DETAILED DESCRIPTION

Generally, the present invention provides a method and apparatus for one-way communication between a user and another party.

In the preferred embodiment, the one-way buffered communicator is used for emergency or alarm situations where a user does not have time to wait for a connection to be established before describing the emergency or alarm situation, such as an assault or robbery. Another advantage of the invention is that a user can convey details regarding the situation and have this information stored until it can be conveyed to emergency personnel or a call operator. In this manner the call operator is able to receive information concerning the emergency or alarm situation from the moment the communicator is activated.

Although many different sizes and shapes are contemplated, the communicator is preferably designed to be discreet so that an assailant, in the case of an assault or robbery, does not notice that a user is communicating information concerning the emergency or alarm situation to another party.

Figure 1B:
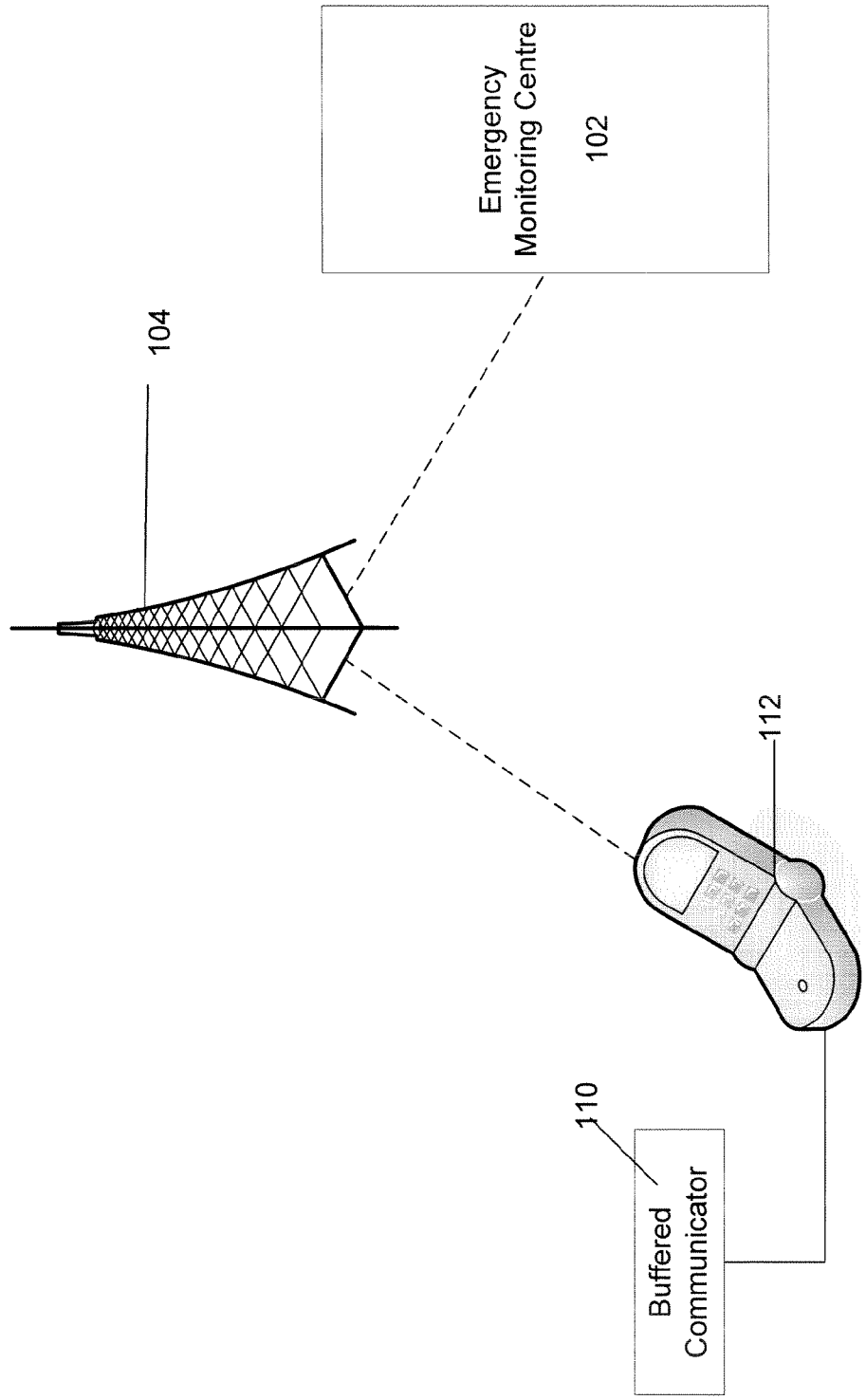
FIG. 1b is a schematic view of another embodiment of a one way buffered communicator in a communication environment.
Figure 2A:
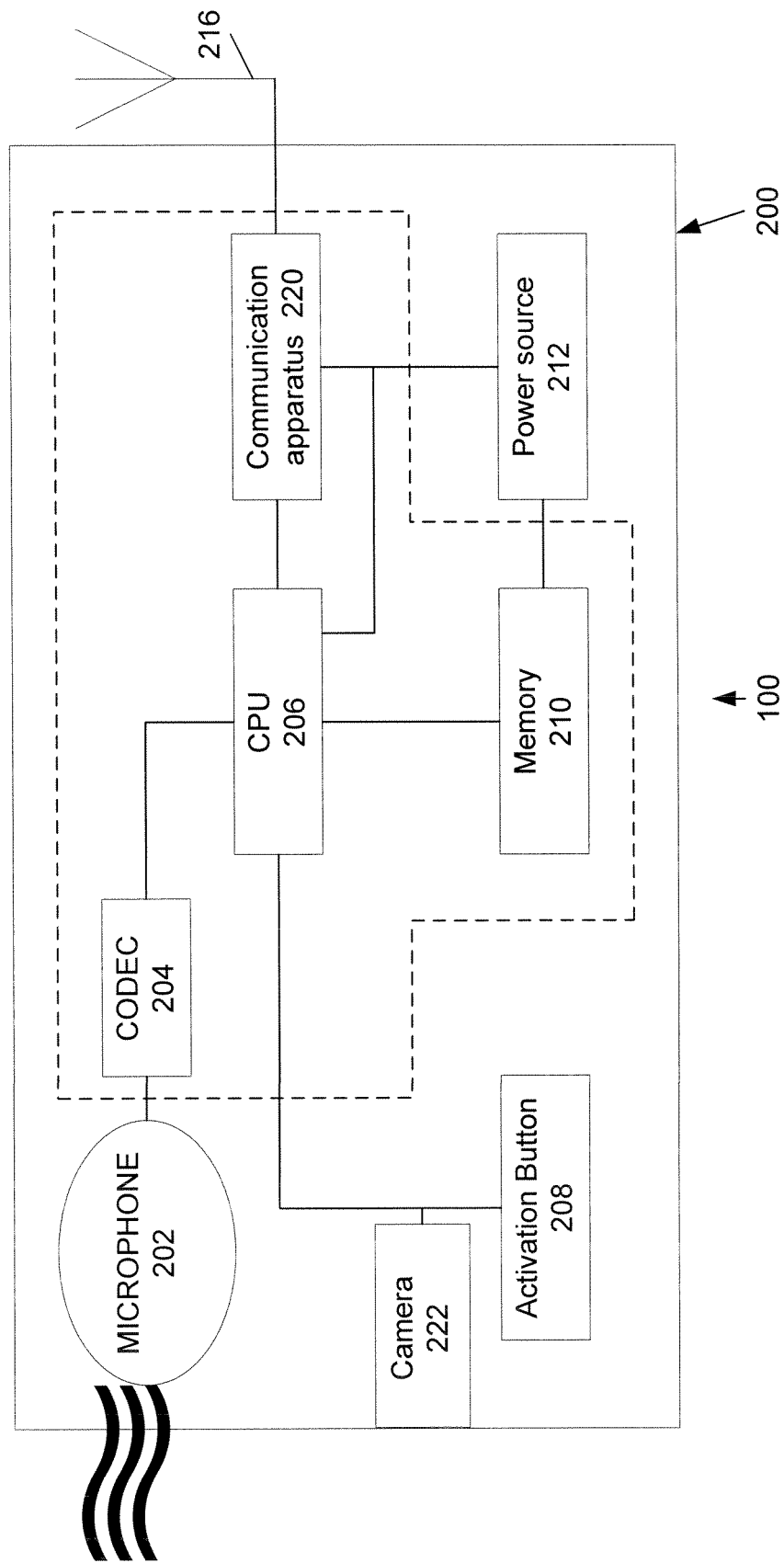
FIG. 2a is a schematic view of a first embodiment of a one way buffered communicator.

Turning to FIGS. 1a and 2a, an embodiment of a one way buffered communicator is shown. FIG. 1a shows the communicator 100 in a communication environment while FIG. 2a is a schematic diagram of the communicator 100. As shown in FIG. 1a, the communicator 100 communicates with a predetermined party, such as an emergency monitoring centre 102, via a communication network 104 preferably using cellular or wifi technology. The predetermined party can alternatively be contacted via an IP address using Voice-Over-IP (VOIP) technology. An advantage of the current invention is that communication between the user and the predetermined party can commence as soon as the user activates the buffered communicator 100 and does not have to wait for a connection to be established since the communicator 100 stores input from the user once it is activated. This is beneficial when there is little or no time for the user to wait before communicating the emergency to the operator.

Turning to FIG. 2a, a more detailed schematic of the buffered communicator 100 is shown. The communicator 100 includes a housing 200 which houses at least one microphone 202 for receiving audio input, in the form of sound waves 203, from an external source. The microphone 202 is preferably a multi-directional microphone which is capable of receiving sound waves from various angles with respect to the communicator 100. Furthermore, multiple microphones can be placed within the housing 200 so that there is improved sound reception. The microphone 202 is connected to a coder/decoder (CODEC) 204 which encodes and/or decodes the audio input into a digital stream or signal. The CODEC 204 is connected to a processor 206, such as a central processing unit (CPU), which, in turn, is connected to an activation means, such as activation button 208, a memory 210, a power source 212 and a communication apparatus 214. Examples of a communication apparatus 214 include, but are not limited to, apparatus for dialing a phone number, a radio frequency (RF) module, a radio transmitter and apparatus for communicating using VOIP. The power source 212 is also connected to the memory 210 and the communication apparatus 214, along with the other components requiring power. The communication apparatus 214 is connected to an antenna 216 which communicates with the predetermined party 102 over the communication network 104.

The communicator 100 can also include a camera 222 for capturing video input, along with the audio input, concerning the alarm or emergency situation. As will be understood, the communicator 100 can include one memory 210 for the audio input and a separate memory for the video input or both audio and video inputs can be stored in a single memory. In another embodiment, the camera 222 and the microphone 202 can be combined as a single part whereby the camera 222 can receive and capture both video and audio as a single input. As shown by the dotted lines, the CODEC 204, CPU 206, memory 210 and communication apparatus 220 can be located on a single chip and do not have to be separate parts. Although each part can be a discrete part within the housing 200, any number of the parts, encircled by the dotted line can be included on a single chip.

Figure 3:
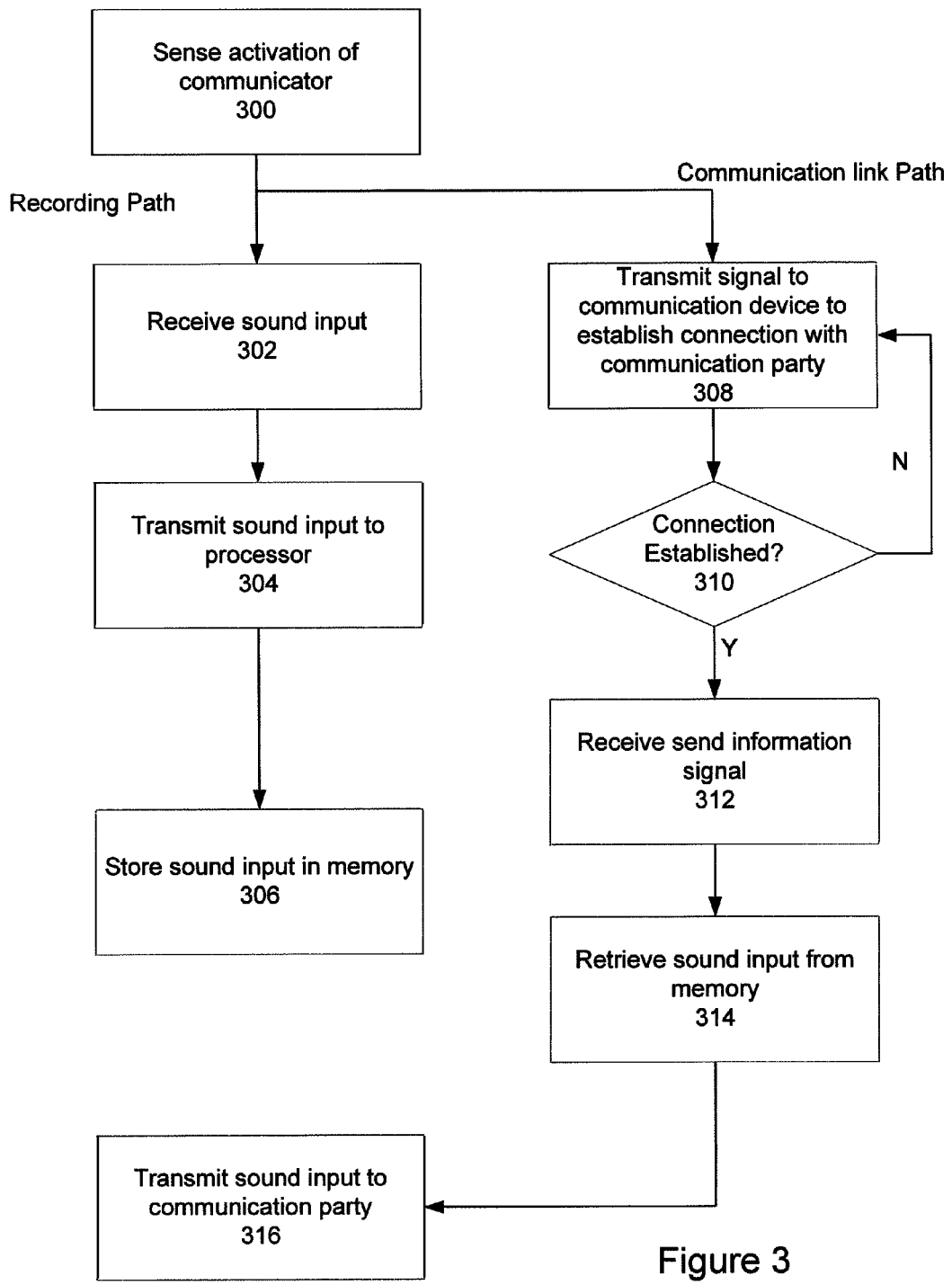
FIG. 3 is a flowchart outlining a method of one-way buffered communication.

In operation, as shown in the flowchart of FIG. 3, the buffered communicator 100 is typically in a stand-by mode until it is activated by a user. When a user determines that an emergency or alarm situation is occurring, the user activates the communicator 100 by pressing the activation, or panic, button 208. The depression of the activation button is sensed by the processor 206 (step 300) as an instruction to activate the communicator 100. Other means for activating the device include, but are not limited to, voice activation or an accelerometer, whereby the speed at which the communicator 100 is moving is sensed and activated if the speed surpasses a predetermined value. The processor 206 then enables sound to begin being recorded (Recording path) and transmits a signal to the communication apparatus 200 to establish a connection with the monitoring centre 104, or predetermined party, (Communication link path). These steps are preferably performed concurrently.

With respect to the Recording path, after being activated, the processor 206 transmits a signal to the CODEC 204 to start encoding and decoding the sound input. As will be understood, in order to save power, the microphone 202 is activated only when the CODEC 204 receives its signal from the processor 206. Once activated, the microphone 202 receives the sound waves from an external source. The sound waves can be voice input from the user or sounds from the environment surrounding the communicator 100 (step 302). The sound waves 203 are then transmitted to and processed by the CODEC 204 into a digital signal and sent to the processor 206 (step 304) which then stores the processed sound input in memory 210 (step 306).

Similar to the steps of audio input retrieval and storage, the camera 222 retrieves video input and the CPU 206 stores the input into the memory 210.

With respect to the Communication link path, after sensing activation, the CPU 206 transmits a signal to the communication apparatus 220 to establish a connection, or communication link, with the monitoring centre 102 (step 308). In one embodiment, the contact information associated with the predetermined party is stored within the communication apparatus 220 and once the signal is received from the CPU 206, the communication apparatus 220 attempts to establish the communication link with the predetermined party. In an alternative embodiment, the signal that is transmitted by the CPU 206 includes the contact information associated with the predetermined party.

A check is then performed to determine if a connection is established between the communicator 100 and the monitoring centre 102 (step 310). If a connection between the communicator 100 and the monitoring centre 104 is not established, another signal is transmitted by the CPU 206 to instruct the communication apparatus 220 to try again.

Once a connection is established, the buffered communicator 100 waits for a send information, or call answered, signal from the monitoring centre 102, preferably in the form of a DTMF tone (step 312). The send information tone represents a tone which is transmitted by the monitoring centre 102 so that the stored data is not transmitted by the one-way buffered communicator until a connection has been reliably established and the predetermined party has confirmed that they are ready to receive, and or listen, to the stored sound input. Alternatively, the stored input can be transmitted once the connection, or communication link, is established.

Once the buffered communicator 100 receives the send information signal, the processor 206 retrieves the sound input that has been stored in the memory 210 (step 314). As will be understood, the CPU 206 includes pointers which provide information concerning the location of the sound input in the memory 210 so that when the processor 206 begins to transmit the sound input, the monitoring centre 102 receives a complete message. A complete message is described as all of the voice input stored from the moment the communicator 100 is activated until the communicator is turned off or stops recording.

In one embodiment, after retrieving the input, the CPU 206 downsamples the stored input before transmitting the data to the monitoring centre 102 (step 316). Alternatively, if the communicator 100 has a large bandwidth channel and it is capable of transmitting high resolution sound, there is no need to downsample the data before transmission. Once transmitted, the operator at the monitoring centre 102 can listen to the recorded sound input to determine the emergency or alarm situation and react accordingly.

If the connection between the communicator and the monitoring centre is lost, the communicator automatically redials the monitoring centre to re-establish the connection. While the connection is being established, the processor 206 determines, via the pointers, the last piece of data that is transmitted. Once connected, the communicator receives the send information signal from the monitoring centre, the processor proceeds to continue the transmission from the marked location.

Turning to FIG. 1b, a second embodiment of a one-way buffered communicator is shown. In this embodiment, the buffered communicator, or communication apparatus, 110 is associated with a communication device 112, such as a cellular telephone or a telephone which is capable of being controlled without manual intervention. Communication between the buffered communicator 110 and the device 112 is preferably via a protocol such as BlueTooth™ technology which is a low power consumption communication protocol, although other communication protocols can be used. When the buffered communicator 110 is activated, signals are transmitted to the communication device 112 to instruct the device 112 to establish a connection, or communication link, with a predetermined party, such as an operator at the emergency response monitoring centre 102, over the communication network 104.

Figure 2B:
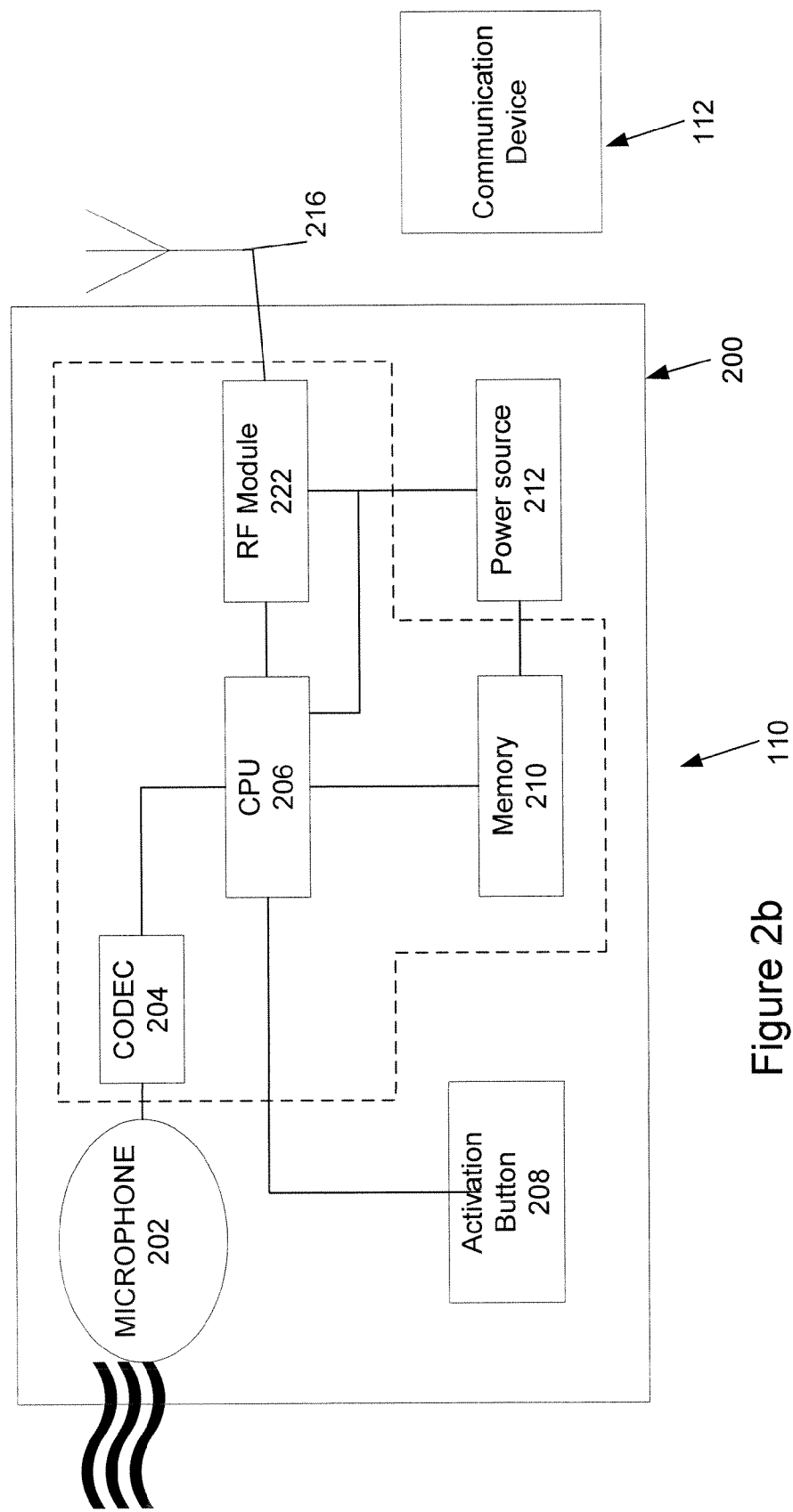
FIG. 2b is a schematic view of a second embodiment of a one way buffered communicator.

As shown in FIG. 2b, the communicator 110 includes similar parts to the communicator 100 of FIG. 2a. The communicator 110 includes the microphone 202, the activation button 208, the CODEC 204, the CPU 206, the memory 210 and the power source 212 located within housing 200. The communicator 110 includes a communication apparatus, seen as RF module 222, which communicates with the communication device 112 via the antenna 216 using the selected communication protocol. Although not shown, it will be understood that the communicator 110 can also include a camera for capturing video input.

In operation, with reference to FIG. 3, the Recording path is performed in an identical manner as described above with respect to FIGS. 1a and 2a. However, the Communication link path is executed in a slightly different manner as will now be described.

After sensing the activation, the communicator 110 transmits a signal to the communication device 112 to establish a connection with the monitoring centre 102 (step 308). This is preferably accomplished by transmitting a signal to the communication device 112 via the RF module 222. In the preferred embodiment, the communicator 110 transmits a signal to the communication device 112 instructing the communication device 112 to establish a connection with a predetermined telephone number which is stored in the communication device 112. Alternatively, the signal from the communicator 100 can include the contact information, such as the phone number, which the communication device 112 is to dial.

A check is then performed to determine if a connection is established between the communication device 112 and the monitoring centre 102 (step 310). If a connection between the communication device 112 and the monitoring centre 102 is not established, another signal is transmitted by the CPU 206 to instruct the communication device 112 to re-attempt.

Once a connection is established, the buffered communicator 100 waits for the send information, or call answered, signal from the monitoring centre 102 (step 312) via the communication device 112.

Once the buffered communicator 100 receives the send information signal, the processor 206 retrieves the sound input that has been stored in the memory 210 (step 314) and transmits the data to the monitoring centre via the RF module 222 and the communication device 112 (step 316). As with the previous embodiment, if the communication device 112 is capable of transmitting high resolution sound, there is no need to downsample the data before transmission.

After the operator receives and listens to the sound input, the operator can determine if they wish to speak with the user. If the operator wishes to contact the user, the operator can transmit an end call signal to the communicator 110, via the communication device 112 to disconnect the call, or communication link. This will be described in more detail below.

Figure 1C:
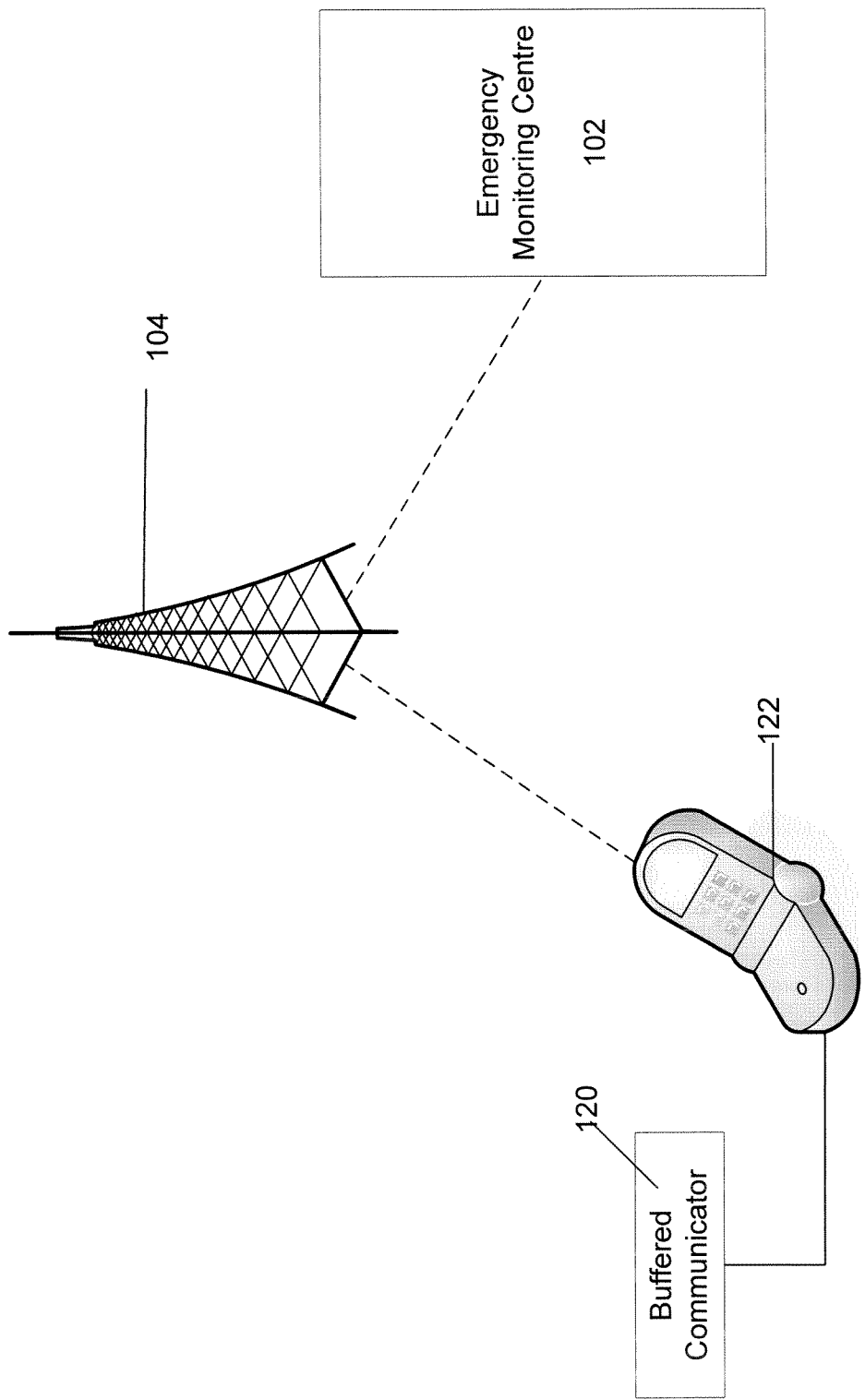
FIG. 1c is a schematic view of a further embodiment of a one way buffered communicator in a communication environment.
Figure 2C:
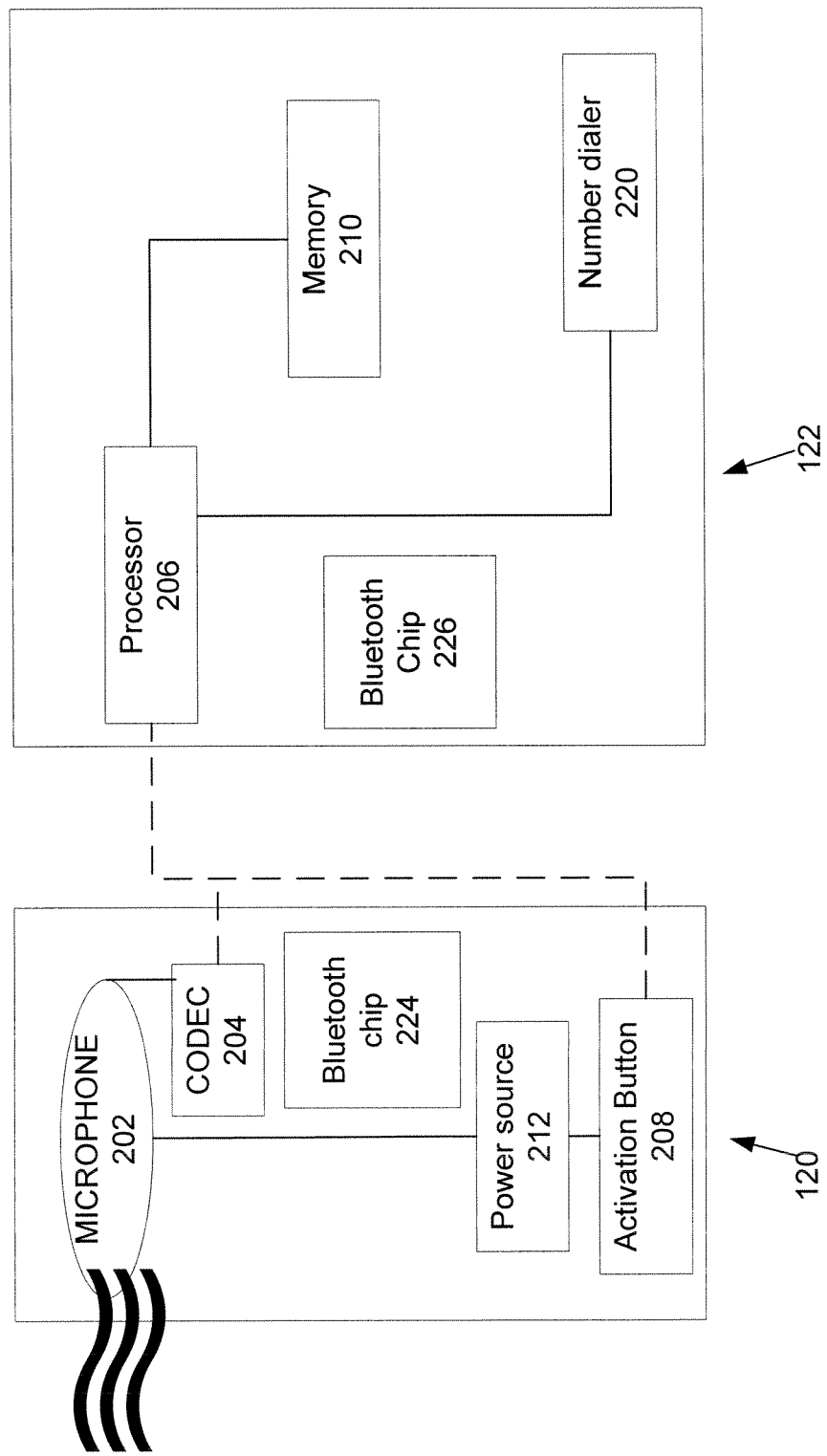
FIG. 2c is a schematic view of a third embodiment of a one way buffered communicator.

FIG. 1c is an overview of a communication environment for use with the buffered communicator of FIG. 2c. In this embodiment, the communicator 120, which can be seen as an input receiving device, operates in partnership with the communication device 122 to buffer the stored input. In the current embodiment, the communicator 120 includes at least one microphone 202 for receiving sound input from an external source, the activation button 208, the CODEC 204 and an RF module 224, such as a BlueTooth chip, for communication with a corresponding RF module, or BlueTooth chip 226 within the communication device 122. The BlueTooth chip 224 and the CODEC 204 can be located on a single chip. The communication device 122 further includes memory 210, processor 206 and apparatus for establishing a communication link 220, such as a phone number dialer. As will be appreciated, the combination of the communicator 120 and the communication device 122 operate in a similar manner as described with respect to FIG. 3 with the buffering occurring within the device 122.

In operation, when the communication is activated by the activation button (step 300), external sound waves are received by the microphone 202 (step 302) and then passed to the CODEC 204 for processing. The digitized sound input is then transmitted to the processor 206 (step 304), via the two BlueTooth chips 224 and 226, and then stored in the memory 210 (step 306). Concurrently, the processor 206 transmits a signal to the communication apparatus 220 to dial a predetermined number, associated with the monitoring centre, to establish a communication link once it senses activation of the activation button 208. Once the connection, or communication link, is established, the processor 206 transmits the stored input.

In an alternative embodiment, the CODEC 204 is located on the communication device 122 along with an analog receiver, or filter. Once the communicator is activated, the microphone receives the sound input and transmits the analog signal, via an analog transmitter, to the analog filter which then transmits the sound input to the CODEC 204 for digitizing.

A further embodiment, in order to stop the recording and transmission process, the monitoring centre can transmit a security code to the buffered communicator instructing the CPU 206 to stop recording and have the communicator 100, 110 or 120 re-enter the stand-by mode.

Along with the transmit signal and the call connected signal, the communicator can receive other signals, or DTMF tones, from the monitoring centre 102. These tones include, but are not limited to, a call answered tone, a set time tone, an operator hold tone, a switch audio to present tone, a drain audio and cancel alarm tone and a cancel alarm tone.

The set time tone is in response to a Get time request from the communicator and allows the monitoring centre to update the time on the communicator. The operator hold tone instructs the call between the communication device and the monitoring centre to be disconnected so that an operator at the monitoring centre can attempt to call the communication device. The switch audio to present tone is transmitted by an operator when the operator wishes to hear what is happening in real time rather than from the stored data. Once the processor receives the switch audio tone, the processor proceeds to transmit the output from the CODEC in real-time to the monitoring centre by moving the pointer to the end of the data stream. While the buffered communicator is transmitting the sound in real-time, the sound input can still be stored in the memory.

The drain audio and cancel alarm tone is transmitted by the operator when it is determined an alarm or emergency situation has passed. Upon receipt of this tone, the buffered communicator stops recording and transmits all the stored audio data and then disconnects the call and returns to standby mode.

The cancel alarm tone is transmitted by the operator when it is determined that the alarm or emergency situation has passed. This is similar to the drain audio and cancel alarm tone without the stored audio data being dumped to the monitoring centre.

In the situation where the memory is full, the buffered communicator can transmit the sound input in real-time, however communication is maintained in a single direction from the buffered communicator to the monitoring centre. In an alternative embodiment, the information is stored in a memory loop, whereby when the memory is full, the processor 206 continues storing the sound input by over-writing the sound input at the beginning of the memory. As will be understood, a check is performed to ensure that the information being over-written has already been transmitted to the monitoring centre.

Although not specifically shown in each embodiment, it will be understood that all those components that require power for operation are connected to a power source.

In yet a further embodiment, the memory 210 is housed within a protective box to preserve the memory in the case where the communicator 100 becomes damaged. In another embodiment of the invention, the microphone is an omni-directional microphone, or a directional microphone depending on the preferred sound recording method.

In yet another alternative embodiment, the communicator 110 or 120 is connected directly to the communication device 112 or 122 and communicates directly through a wired connection.

In another embodiment, the buffered communicator can transmit sound in real-time to the monitoring centre along with the stored input. In an alternative embodiment, the input, either audio, video or a combination of both, can be stored at a first speed and then transmitted to the predetermined party at a second speed so that all of stored input is quickly transmitted so that the communicator can operate in real-time.

In yet another embodiment, the one-way buffered communicator can be used as a dictation device whereby a user's comments can be buffered and then transmitted to a remote server for storage or processing.

In another embodiment, if the sound input does not reach a predetermined decibel level, the CPU 206 does not record the sound input. In this manner, the buffered communicator is able to manage the memory storage so that only audible inputs are stored and transmitted.

In yet a further embodiment, each time the activation button is pressed, the recording path is activated and sound input is stored in the memory. The sound input can overwrite the previously stored information or can be stored at the end of the previously stored information (as determined by the pointers in the CPU). Alternatively, the buffered communicator is activated after the CPU has received a signal that the memory can be cleared. This signal can be transmitted by the monitoring centre after the previously stored information has been listened to by the monitoring centre or by the user after the emergency situation has passed.

In an alternative embodiment, if an operator at the monitoring centre wishes to contact the user to determine if the user is in an emergency or alarm situation, the operator transmits the operator hold signal to the communication device/communicator. Once the buffered communicator receives the operator hold signal, the CPU transmits a signal to the communication device to disconnect the call between it and the monitoring centre. The communicator, preferably, continues to store sound input. The buffered communicator then proceeds to start a timer for a predetermined time duration before the communicator re-establishes a connection with the monitoring centre. During this predetermined time duration, the operator can establish a connection with the communication device by dialing the phone number of the communication device. After the predetermined time duration elapses, the communicator transmits a signal to the communication device to re-establish a connection with the monitoring centre. If the communication device is in use, such that the operator has established a connection with the user, the communicator continues to attempt to re-dial until a connection is established. If during the conversation between the user and the operator, it is determined that no alarm or emergency is occurring, the operator re-connects with the communicator transmits either a drain audio and cancel alarm signal or a cancel alarm signal to the communicator and the communicator returns to a standby mode. Alternatively, if an emergency or alarm situation is occurring, the communicator continues to transmit the input being stored by the communicator.

Another advantage of the invention is that even if the user can not speak, the communicator continuously records sound input so that the operator can determine the nature of the situation based on background noises.

Another advantage of the invention is that information can be stored even when a connection, or communication link, can not be established by the communication device so that if the communicator is found later, the stored input can still be retrieved.

In the above description, for purposes of explanation, numerous details have been set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A one-way buffering communication system for use in an emergency scenario comprising:
   a portable input receiving device including a data storage and a portable input device radio frequency (RF) module; and a mobile communication device including a mobile communication device RF module for communicating with the portable input receiving device;

wherein the data storage stores emergency audio or video input received by the portable input receiving device during the emergency scenario and communication between the portable input receiving device and the mobile communication device is enabled via their associated RF modules;

wherein, communication, to transmit the emergency audio or video input, between the portable input receiving device and the mobile communication device is initiated by the portable input receiving device.

2. The one-way buffering communication system of claim 1 wherein the portable input receiving device further comprises:

apparatus for receiving the audio or video input from an external source.

3. The one-way buffering communication system of claim 2 wherein the apparatus for receiving is a microphone or a camera.

4. The one-way buffering communication system of claim 2 wherein the portable input receiving device further comprises:

a CODEC for processing the audio or video input.

5. The one-way buffering communication system of claim 1 wherein the portable input device RF module and the mobile communication device RF module are BlueTooth™ chips.

6. The one-way buffering communication system of claim 1 wherein the stored input is transmitted from the portable input receiving device to the mobile communication device via the RF modules.

7. The one-way buffering communication system of claim 1 wherein the mobile communication device comprises:

apparatus for establishing a communication link between the mobile communication device and a predetermined party.

8. The one-way buffering communication system of claim 7 comprising apparatus for transmitting the stored audio or video input to the predetermined party once the communication link is established.

9. The one-way buffering communication system of claim 8 wherein the storing of the audio or video input and the establishing of the communication link are performed concurrently.

10. A method of providing one-way buffered communication in an emergency scenario comprising:

sensing a request for one-way buffered communication;

establishing a connection between a portable input receiving device and a mobile communication device for transmitting emergency audio or video input received during the emergency scenario, the connection initiated by the portable input receiving device;

receiving emergency audio or video input at the portable input receiving device;

storing the emergency audio or video input;

transmitting the emergency audio or video input to the mobile communication device;

establishing a communication link between the mobile communication device and a predetermined party; and transmitting the stored audio or video input to the predetermined party once the communication link is established.

11. The method of claim 10 further including:

processing the audio or video input at the portable input receiving device after receiving the audio or video input.

12. The method of claim 10 further including:

processing the audio or video input at the mobile communication device after receiving the audio or video input from the portable input receiving device.

13. The method of claim 10 wherein establishing a communication link comprises:

retrieving information corresponding to a predetermined party; and establishing the communication link with the predetermined party based on the information.

14. The method of claim 13 wherein the information is a phone number or an IP address.

15. The method of claim 13 further including the step:

receiving a send information signal from the predetermined party before transmitting the stored audio or video input.

16. The method of claim 10 further comprising:

sensing a disruption of the communication link;

determining a last input transmitted;

re-establishing the communication link; and transmitting the audio or video input from the last input transmitted.

17. A one-way buffering communication system for use in an emergency scenario comprising:

a portable input receiving device including an input device radio frequency (RF) module; and a mobile communication device including a data storage and a communication device RF module for communicating with the portable input receiving device;

wherein the data storage stores emergency audio or video input received from the portable input receiving device during the emergency scenario and communication between the portable input receiving device and the mobile communication device is enabled via their associated RF modules;

wherein, communication, to transmit the emergency audio or video input, between the portable input receiving device and the mobile communication device is initiated by the portable input receiving device.

18. The one-way buffering communication system of claim 17 wherein the input receiving device further comprises:

apparatus for receiving audio or video input from an external source.

19. The one-way buffering communication system of claim 17 wherein the mobile communication device further comprises:

apparatus for establishing a communication link between the mobile communication device and a predetermined party.

20. The one-way buffering communication system of claim 19 comprising apparatus for transmitting the stored audio or video input to the predetermined party once the communication link is established.

21. The method of claim 10 wherein the storing of audio or video input and the establishing of the communication link are done concurrently.

* * * * *